US012525084B2

(12) United States Patent
Boglino et al.

(10) Patent No.: US 12,525,084 B2
(45) Date of Patent: Jan. 13, 2026

(54) FLEXIBLE DOCUMENT VALIDATION DEVICE HAVING A DEFLECTOR ELEMENT THAT PROTRUDES FROM A BOTTOM OF A CAVITY

(71) Applicant: ARCA TECHNOLOGIES S.R.L., Bollengo (IT)

(72) Inventors: Marco Boglino, Bollengo (IT); Marco Guerrieri, Bollengo (IT)

(73) Assignee: SESAMI TECHNOLOGIES S.R.L., Bollengo (IT)

( * ) Notice: Subject to any disclaimer, the term of this patent is extended or adjusted under 35 U.S.C. 154(b) by 53 days.

(21) Appl. No.: 18/514,226

(22) Filed: Nov. 20, 2023

(65) Prior Publication Data

US 2024/0185663 A1 Jun. 6, 2024

(30) Foreign Application Priority Data

Dec. 1, 2022 (IT) ........................ 102022000024795

(51) Int. Cl.
*G07D 7/04* (2016.01)

(52) U.S. Cl.
CPC ....................................... *G07D 7/04* (2013.01)

(58) Field of Classification Search
CPC .................................. G07D 7/00; G07D 7/17
USPC ................................ 235/475, 477, 483, 485
See application file for complete search history.

(56) References Cited

FOREIGN PATENT DOCUMENTS

| | | | |
|---|---|---|---|
| CN | 101499188 | 10/2010 | |
| KR | 100716068 | 5/2007 | |
| KR | 20100050961 A * | 5/2010 | ............... G07D 7/01 |
| KR | 101022429 | 3/2011 | |
| WO | WO-2024149739 A1 * | 7/2024 | ............. G07D 11/16 |

OTHER PUBLICATIONS

Machine translation of WO2024/149739 retrieved Mar. 1, 2025 (Year: 2025).*
Machine translation of KR-20100050961, retrieved from Korean Patent Office on Sep. 17, 2025 (Year: 2025).*
Ministry of Business and Made in Italy, Search Report for International Patent Application No. IT102022000024795, Jun. 8, 2023.

* cited by examiner

*Primary Examiner* — Suezu Ellis
(74) *Attorney, Agent, or Firm* — Williams Mullen; R. Brian Drozd

(57) ABSTRACT

A device for validating flexible documents is described. The device has an input portion, an output portion and an intermediate portion interposed between the input portion and the output portion, through which each of the flexible documents is moved by means of movement members along a movement direction. The device also has at least one sensor, which is positioned at the intermediate portion, and a deflector element, conformed as a laminar element, which protrudes from a bottom of the intermediate portion and is configured to deflect the dynamics of the flexible document so as to bring it against the at least one sensor.

19 Claims, 2 Drawing Sheets

FLEXIBLE DOCUMENT VALIDATION DEVICE HAVING A DEFLECTOR ELEMENT THAT PROTRUDES FROM A BOTTOM OF A CAVITY

CROSS-REFERENCE TO RELATED APPLICATION

This application is based on international Italian patent application IT102022000024795 filed on Dec. 1, 2022, the entire disclosure of which is incorporated herein by way of reference.

FIELD OF THE INVENTION

The present invention relates to a validation device for validating flexible documents comprising a sensor or head, with respect to which individual flexible documents are passed through.

Such a validation device is usable in an apparatus for handling flexible documents, such as an apparatus for receiving and dispensing flexible documents.

In the remainder of this description, reference will mainly be made to flexible documents such as banknotes. However, it should be borne in mind that the validation device according to the invention may be applied to any other type of flexible document, including paper documents such as cheques, notes, certificates and licenses, always remaining within the scope of protection of the present invention as defined by the appended claims.

For the validation of banknotes, it is known in the trade as well as in the banking field to use equipment for receiving and dispensing banknotes which comprise within them a validation device in turn comprising at least one sensor or detection head in relation to which individual banknotes are moved.

According to a preferred embodiment, the validation device comprises at least one magnetic head in relation to which the banknotes are passed, such that the head is capable of detecting at least one security element or any magnetisation of the banknote itself.

Each banknote, during its handling, is brought into contact or close proximity with the magnetic head so that it can be read by the latter.

A well-known solution involves the use of a motorised roller positioned at the bottom of the magnetic head and configured to drag the banknote so as to force it to touch the magnetic head itself.

To ensure the handling of the banknote relative to the magnetic head, the roller is spaced from the magnetic head with a separation distance of a few tenths of a millimetre, e.g. 0.3 mm or 0.4 mm. This is to allow banknotes to pass through even if they are damaged or bear a foreign object such as adhesive tape or a paper clip.

In fact, the passage of the banknote must always be guaranteed in order to prevent the banknote from becoming entangled between the roller and the magnetic head, with the risk of irreparable damage or even damage to the magnetic head itself. A limitation of the use of such a solution concerns the extreme precision required not only in the realisation of the assembly but also in the realisation of the components, with particular reference to the outer surface of the roller. Only high precision can ensure that there is a cavity between the roller and the magnetic head whose amplitude falls within a specific predefined range.

As explained above, this range is particularly narrow, with the consequence that an incorrect assembly in the order of one or more millimetres would compromise the proper functioning of the entire validation device.

The purpose of the present invention is to enable the effective operation of a flexible document validation device within the context of a simple, efficient, reliable and flexibly deployable solution.

A further purpose of the present invention is to facilitate the installation and maintenance of a validation device by means of which flexible documents, preferably banknotes, can be validated.

A further scope of the present invention is to ensure a durable operation of the validation device.

It is a specific object of the invention to provide a validation device, for validating flexible documents, comprising an input portion, into which a flexible document to be validated is introduced, an output portion through which the flexible document exits, an intermediate portion interposed between the input portion and the output portion, wherein the intermediate portion delimits a passageway through which to move the flexible document, movement members that face at least partially into the passageway and are configured to move each of the flexible documents along a movement direction, wherein the validation device comprises at least one sensor at the intermediate portion facing into the cavity through a top of the cavity, and at least one deflector element configured as a laminar element protruding inclined from a bottom of the cavity, wherein the at least one deflector element is elastically deformable and is configured to deflect the dynamics of the flexible document along the handling direction by moving it away from the bottom to bring it into feedback against the at least one sensor.

According to another aspect of the invention, the deflector element may comprise at least one foil element made of an elastically yielding material.

According to a further aspect of the invention, the deflector element may define a ramp converging towards the at least one sensor.

According to an additional aspect of the invention, the deflector element may have, along the movement direction, a first end portion connected to the bottom of the cavity and a second end portion opposite the first end portion which is free and in abutment against the at least one sensor or at least partially overlapping the at least one sensor.

According to another aspect of the invention, the foil element can be made of polyester from a polyethylene terephthalate.

According to a further aspect of the invention, the deflector element may comprise at least two foils made of elastically yielding material partially overlapping each other. According to an additional aspect of the invention, at least one of the foils comprised in the deflector element may have a plurality of notches, spaced apart from each other, capable of modifying the flexural rigidity of the deflector element, optionally wherein the notches are parallel to each other and to the movement direction.

According to another aspect of the invention, the deflector element may be removably connected to a seat which is delimited along the bottom of the cavity.

According to a further aspect of the invention, the seat may be inclined with respect to the movement direction.

According to an additional further aspect of the invention, the seat may be convergent towards the at least one sensor.

According to another aspect of the invention, the deflector element may have a plurality of passing through openings which are defined at the first end portion for the connection between the deflector element and respective retaining elements present in the seat.

According to further aspect of the invention, the bottom of the cavity may have a ramp positioned upstream from the deflector element along the movement direction.

According to an additional aspect of the invention, the first end portion and the second end portion may be connected to each other by means of a continuous, rounded, edge-free surface.

The advantages of the validation device according to the invention are evident. Indeed, the validation device according to the invention has an overall simple structure, which is easy to assemble and use.

Furthermore, the validation device according to the invention comprises a deflector element, of an elastically deformable type, configured to deflect the trajectory of a flexible document that is moved through the validation device, to effectively bring it into feedback against a sensing portion included in the validation device.

Compared to conventional type solutions comprising a roller configured to bring the flexible document to be validated close to the validation device, so as to lap it, the deflector element comprised in the validation device according to the invention ensures a certain contact between the flexible document and the validation device, ensuring that the contact between the flexible document and a sensor included in the validation device occurs along a contact surface.

BRIEF SUMMARY OF THE DRAWINGS

The present invention will now be described, by way of illustration, but not limitation, in accordance with its preferred embodiments, with particular reference to the accompanying Figures of the drawings, wherein.

Figure 1:
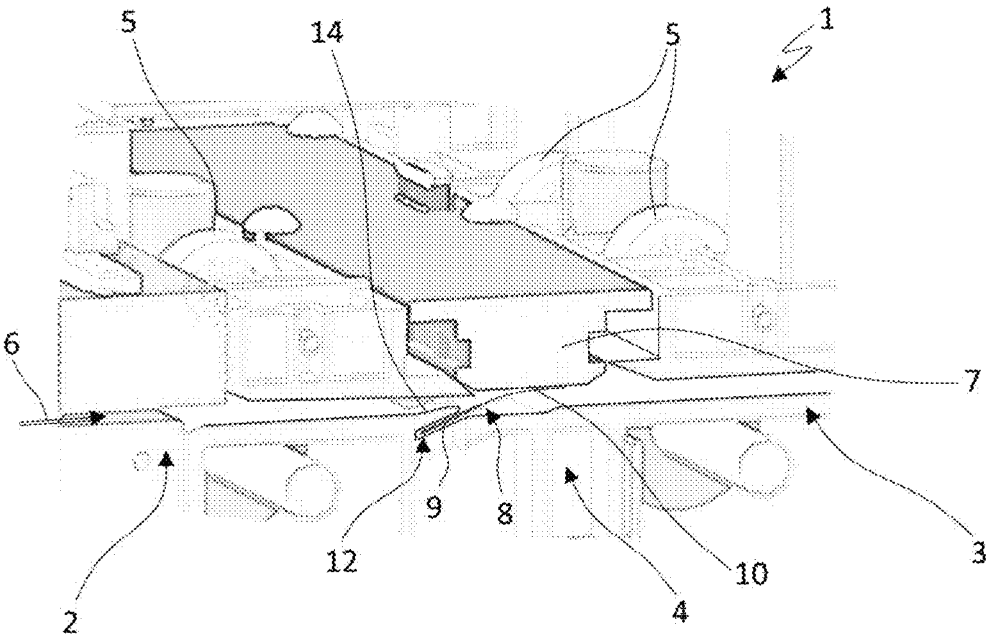
FIG. 1 shows a schematic perspective view of a validation device according to the invention installed on board a device for receiving or dispensing flexible documents.

A validation device for the verification of flexible documents, with particular reference to banknotes, not illustrated in the attached figures, is wholly indicated by 1.

DETAILED DESCRIPTION

In the following description, explicit reference will be made to flexible documents configured as magnetised banknotes, for instance because they contain at least one magnetisable security element, the validation of which requires the use of at least one magnetic-type sensor.

It is to be understood that alternative embodiments, not described in detail, are possible wherein the flexible documents are configured differently from a banknote, for instance are a cheque, the validation of which is of an optical type, thus requiring at least one optical type sensor.

As will be better described below, the validation device 1 delimits a portion of the passageway through which flexible documents are individually moved so as to lap a validation sensor.

The validation device 1 comprises an input portion 2, into which the one or more flexible documents to be validated are sequentially introduced, an output portion 3, through which the one or more flexible documents exit, and an intermediate portion 4 configured as a cavity and interposed between the input portion 2 and the output portion 3.

In particular, the intermediate portion 4 is configured as a cavity thus meaning that it is bounded between a top and a bottom spaced apart.

The validation device 1 further comprises movement members 5 that face, at least partially, into the cavity to contact from time to time the individual flexible documents and move them between the input portion 2, the intermediate portion 4 and finally through the output portion 3, along a movement direction 6.

By way of illustration but not limitation, the movement members 5 comprise wheels configured to feedback against each of the flexible documents and to be selectively rotatably actuated to cause them to move forward, in a manner within the reach of the person skilled in the art, which, therefore, will not be further described.

The validation device 1 comprises at least one sensor 7 positioned along the intermediate portion 4, so as to face away from a top of the cavity, and a deflector element 8, positioned at the at least one sensor 7.

The deflector element 8 is configured to deflect the individual flexible documents in transit along the validation device 1, from the bottom of the cavity so as to bring them, during their advancement along the movement direction 6, in creeping feedback against the at least one sensor 7.

Preferably, the at least one sensor 7 is of a magnetic type and comprises a magnetic head facing into the cavity to be lapped from time to time by each of the flexible documents.

The deflector element 8 is conformed as a foil-like element which protrudes inclined from a bottom of the cavity and is directed towards the top of the cavity.

According to a preferred embodiment, the deflector element 8 comprises at least one foil element made of an elastically yielding material.

The expression "elastically yielding" is intended to indicate that the material, from which the deflector element 8 is made, is capable of deforming when subjected to a force and of returning exactly to its initial, non-deformed configuration when not further subjected to such a force.

In other words, deflector element 8 is able to work like a leaf spring.

In particular, it is pointed out that the deformation force to which the deflector element 8 is subjected is that determined by the passage of a flexible document, such as a banknote, which insists against the deflector element 8 itself.

In this regard, the expression "elastically yielding" is intended to indicate that the force to which the deflector element 8 is subjected is comprised within the range of stresses such as to induce in the deflector element 8 a deformation belonging to the elastic deformation range, without therefore any plastic deformation which, as is well known, determines a permanent deformation and such as not to allow the deformed body to return to its initial non-deformed configuration. By way of a purely illustrative and non-limiting example, it should be noted that the deflector element 8 is capable of ensuring its fully elastic deformation in the order of a few millimetres, preferably at least one millimetre.

Figure 2:
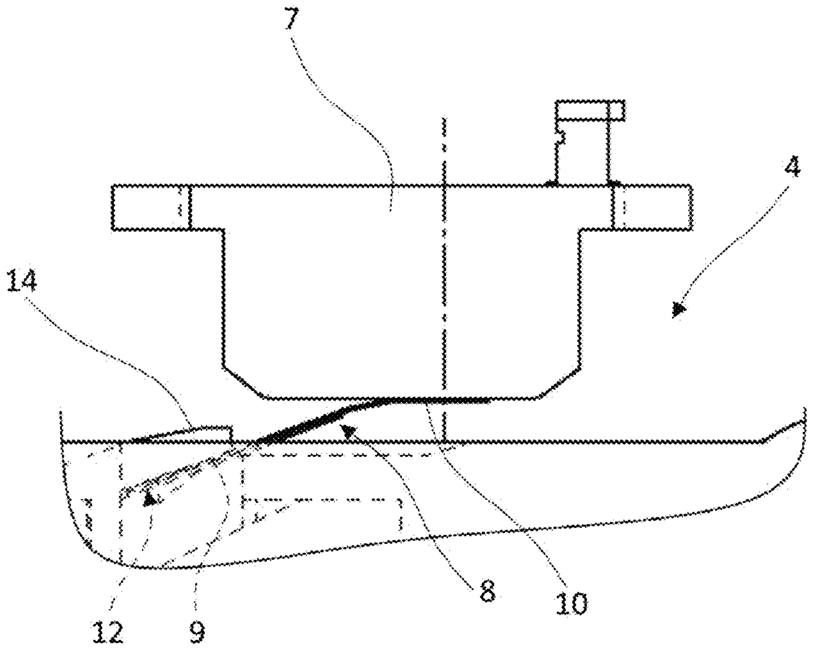
FIG. 2 shows a section and detail view of some components of the validation device according to the invention.

With reference to what is illustrated by way of example but not limitation in the attached FIG. 2, the deflector element 8 defines a ramp that extends from a bottom of the cavity and converges towards the top of the cavity itself, at the at least one sensor 7.

More in detail, proceeding along the movement direction 6, the deflector element 8 has a first end portion 9, operatively connected to the bottom of the cavity and a second end portion 10, opposite to the first end portion 9, which is free and positioned against the at least one sensor 7 or against a portion of the top of the cavity proximal to the at least one sensor 7.

In particular, between the first end portion 9 and the second end portion 10, there is a curved section which promotes the advancement dynamics of each of the flexible documents, 20 preventing them from jamming.

By the term curved section, it is intended to indicate that the first end portion 9 and the second end portion 10 are connected to each other by means of a continuous, rounded surface free of edges.

The presence of the curved section is determined by the fact that the second end portion 10 is placed against the at least one sensor 7 or a portion of the cavity in close proximity to the at least one sensor 7. In this way, the deflector element 8 is deformed so as to assume the ramp configuration, comprising the curved section.

As shown in FIG. 2, the deflector element 8 in an undeformed configuration appears flat or substantially flat.

The passage of the individual flexible documents along the deflector element 8 results in a deformation of the second end portion 10 from time to time, moving away from the at least one sensor 7.

The deflector element 8 subsequently to the end portion 10 along the movement direction 6 ends, i.e. it is not connected to any further portion of the cavity.

The second end portion 10, following the passage of each of the flexible elements, then elastically returns to its original undeformed position, in feedback to the at least one sensor 7.

Since the deflecting element 8, as mentioned above, is elastically yielding, the same, after having been deformed in moving away from the at least one sensor 7, tends to return to the undeformed position in abutment against the at least one sensor 7, acting as a contrasting element that allows the individual flexible documents to move forward along the movement direction 6 and to lap the at least one sensor 7.

According to a preferred embodiment, the deflector element 8 comprises at least one elastically deformable portion made of polyester from a polyethylene terephthalate or is made entirely of polyester.

In particular, such polyester may be Mylar®, i.e. a polyester obtained from polyethylene terephthalate by a condensation reaction between ethylene glycol and terephthalic acid.

It is understood that alternative forms of embodiment are possible wherein the deflector element 8 is made of another material that exhibits a deformation of a purely elastic type when subjected to a deformation force that is caused by the passage of a flexible document, such as a banknote or a sheet.

Figure 3:
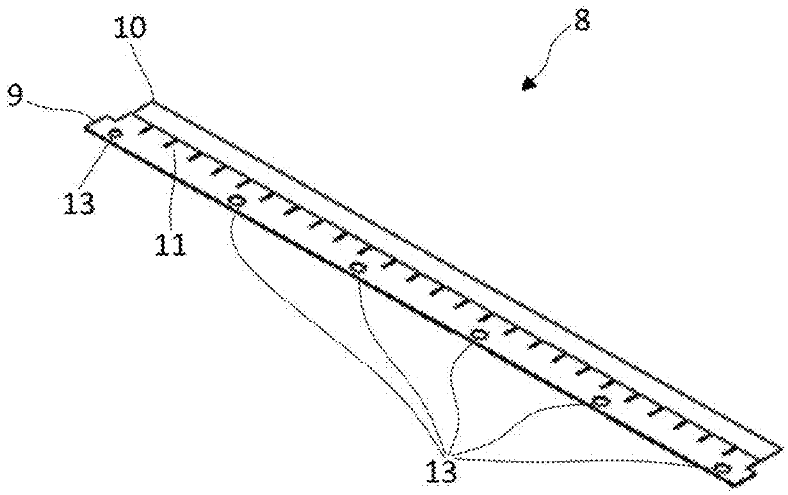
FIG. 3 shows a detail perspective view of a component of the validation device according to the invention.

Referring to the embodiment illustrated in the attached Figures, in particular FIGS. 2 and 3, the deflector element 8 comprises at least two sheets of elastically yielding material partially overlapping each other.

By varying the extent of the overlapping portion and/or the total number of the foils and/or their specific thickness, it is possible to vary the flexural rigidity of the deflector element 8, depending on the requirements of use.

In this way, it is possible to give the deflector element 8 a high degree of flexibility and modularity of use within the framework of an extremely low-cost solution.

The individual foils that make up deflector element 8 are connected to each other, for instance glued or welded together.

Optionally, at least one of the foils comprising the deflector element 8 has a plurality of notches 11, spaced apart from each other, capable of modifying the flexural rigidity of the deflector element 8, with particular reference to the rigidity of the second end portion 10.

With reference to what is illustrated by way of example in the attached FIG. 3, the deflector element 8 has a plurality of notches 11 parallel to each other and to the movement direction 6. Such notches 11 are configured to ensure that the contrast force, which results in pressure, exerted by the deflector element 8 on the individual flexible documents is constant along the entire extent of the at least one sensor 7, i.e. along a direction transverse to the 5 movement direction 6. For example, the presence of notches 11 makes it possible to keep the pressure exerted by the deflector element 8 constant along the entire extension of the latter, along a direction transverse to the handling direction 6, even in the case where the flexible document presents a non-constant thickness due, for example, to the presence of a tape or a foreign element only along a portion thereof.

The deflector element 8 is connected to the intermediate portion 4 of the validation device 1 in a removable manner.

Preferably, the deflector element 8 is connected to and retained in a seat 12 delimited along said bottom portion of the cavity, in order to be easily removed, should its maintenance or replacement be required.

The seat 12 is positioned upstream from the at least one sensor 7 along the movement direction 6.

According to a preferred embodiment illustrated in the attached FIGS. 1 and 2, the seat 12 is inclined with respect to the movement direction 6.

In more detail, the seat 12 is inclined converging towards the at least one sensor 7, i.e. it is inclined towards a portion of the top of the cavity.

The inclination of the seat 12, in fact, determines the inclination of the first end portion 9 of the deflector element 8.

By way of illustration but not limitation, the deflector element 8 delimits passing through openings 13 at the first end portion 9 (see FIG. 3) configured to be engaged by respective pins, not illustrated in the appended Figures, which extend at the seat 12.

Such pins, by way of example, may partially protrude within the seat 12, from a wall thereof, to allow the first end portion 9 of the deflector element 8 to be inserted into the seat 12 itself and thus engage the passing through openings 13 to retain, thereby, the deflector element 8 in the seat 12.

The pins, in addition to retaining the deflector element 8 within the seat 12, act as a centring device to thus ensure correct positioning of the deflector element 8 itself within the validation device 1.

In order to remove the deflector element 8 from the seat 12, it is sufficient to proceed in the reverse manner, i.e. by disengaging the passing through openings 13 from the pins and moving the deflector element 8 away from the seat 12.

According to an alternative embodiment not illustrated in the attached Figures, the 5 validation device 1 comprises a clamp element at the seat 12 configured to selectively retain or release the deflector element 8.

As mentioned above, the deflector element 8 allows the path of each flexible document to be deflected until it laps against the at least one sensor 7, without penalizing the dynamics of the flexible document.

By way of illustration but not limitation, according to one embodiment of the deflector element 8, the same has a substantially rectangular plan form, wherein the bottom side, i.e. the side that is aligned parallel or substantially parallel to the movement direction 6, is within a range between 10 mm and 25 mm, preferably between 13 mm and 22 mm and even more preferably between 15 mm and 18 mm.

It is to be understood that alternative embodiments of the deflector element 8 presenting a rectangular plan development with a lower side of different dimensions than those described above are possible.

Again, by way of illustration but not limitation, it is to be noted that in the deflector element 8 each of the foils included therein may have a respective thickness or the same thickness as that of the other foils.

According to a preferred embodiment, the deflector element 8 comprises two foils of different thicknesses. In particular, each of the foils has a thickness of less than one millimetre. By way of example but not limitation, the deflector element 8 has a thickness at the second end portion 10 of between 0.1 mm and 0.2 mm, preferably 0.12 mm, and at the first end portion 9 has a thickness of between 0.1 mm and 0.3 mm, preferably 0.19 mm.

It is understood that alternative embodiments of the validation device 1 comprising at least one deflector element 8 having a first end portion 9 and a second end portion 10 each having a respective thickness, different from that of the previously described values, are possible. The deflector element 8 is partially superimposed on the at least one sensor 7, with particular reference to the second end portion 10.

In this way, the deflector element 8 is able to ensure a greater support surface between the at least one sensor 7 and the flexible document than in conventional solutions in which it is not possible to ensure their mutual and constant contact.

In the case where the at least one sensor 7 is magnetic, as is well known, the response that such a sensor is able to give is directly proportional to the magnetic signal to be detected 5 and inversely proportional to the distance between the magnetised flexible element and the sensor 7 itself. As a consequence, small variations in the separation distance between the flexible document and at least one sensor 7 correspond to considerable variations in the signal detectable by the sensor.

| Distance (mm) | Signal value f(h) |
|---|---|
| 0 | 1.84 |
| 0.1 | 1.515 |
| 0.2 | 1.015 |
| 0.3 | 0.615 |
| 0.4 | 0.41 |
| 0.5 | 0.185 |
| 0.6 | 0.065 |
| 0.7 | 0.035 |

Figure 4:
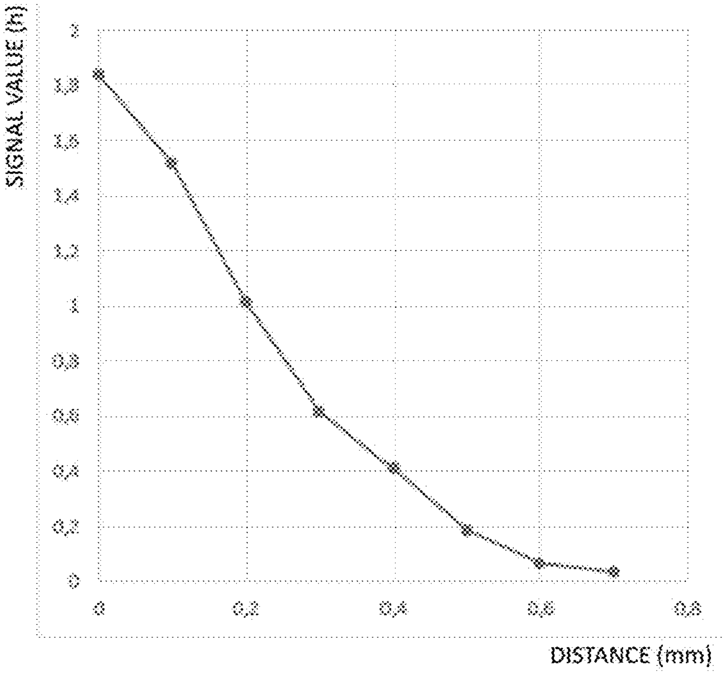
FIG. 4 shows a graph relative to the signal detectable by a validation device as a function of the separation distance between a sensor included in the validation device and a flexible document to be validated.

The above data in the table have been reported in graph form in the attached FIG. 4.

Based on this table, it can be seen that in order to guarantee correct reading and validation of a magnetised flexible document, it is essential to ensure correct contact between the magnetised flexible document itself and sensor 7.

Optionally, the validation device 1 has a ramp 14 or a bump or similar element positioned along the intermediate portion 4, more precisely along the bottom of the cavity, upstream of the deflector element 8 along the movement direction 6 (see FIG. 2).

The ramp 14 guides the flexible document towards the deflector element 8, avoiding any possible jamming of the flexible document itself and facilitating its dynamics along the movement direction 6.

With reference to what has been described, it is evident that the validation device 1 according to the invention is capable of achieving the intended purposes.

The use of the at least one deflector element 8 makes it possible to guarantee constant contact at all times between the at least one sensor 7 and the individual flexible documents to be validated which pass through the validation device 1, thereby preventing the decay in signal quality which, on the contrary, afflicts validation devices of the conventional type.

Furthermore, the at least one deflector element 8 comprising at least one foil made of an elastically deformable material ensures proper contact pressure between the individual flexible documents to be validated and the at least one sensor 7, irrespective of the quality of the individual flexible documents themselves and/or the presence of contamination agents or foreign bodies applied thereto.

In particular, the use of a flexible and elastic material makes it possible to bring each of the flexible elements completely in contact against the at least one sensor 7, not having to guarantee a minimum passage space as provided, on the contrary, in traditional type solutions which envisage the use of a plate element whose behavior is assimilated to that of a rigid body instead of that of an elastic body.

Furthermore, the deflector element 8 ensures that the contact between the at least one sensor 7 and each of the flexible documents passing through the validation device 1 occurs along a contact area and not along a single line, thus ensuring greater operating efficiency to the validation device 1. In fact, it is able to effectively validate the individual flexible documents independently of any geometric tolerances of the same or of any assembly tolerances of the validation device 1, thus overcoming a drawback which afflicts traditional solutions wherein the use of a roller defining the passage section through which each of the flexible documents is advanced is foreseen.

In the foregoing, preferred embodiments have been described and variations of the present invention have been suggested, but it is to be understood that those skilled in the art may make modifications and changes without thereby departing from the relevant scope of protection as defined by the appended claims.

That which is claimed is:

1. A validation device for validation of flexible documents, comprising an input portion into which a flexible document to be validated is introduced, an output portion through which said flexible document exits, an intermediate portion interposed between said input portion and said output portion, wherein said intermediate portion is configured as a cavity that functions as a passageway through which said flexible document is moves, movement members configured to handle said flexible document along a movement direction, at least one sensor positioned facing said cavity, and a deflector element configured to protrude in an inclined manner from a bottom of said cavity, wherein said deflector element is elastically deformable and is configured to deflect said flexible document along said movement direction away from said bottom to bring said flexible document against said at least one sensor.

2. The validation device according to claim 1, wherein said deflector element comprises at least one foil element made of an elastically yielding material.

3. The validation device according to claim 2, wherein said at least one foil element is made of polyester from a polyethylene terephthalate.

4. The validation device according to claim 1, wherein said deflector element defines a ramp converging towards said at least one sensor.

5. The validation device according to claim 1, wherein said deflector element has, along said movement direction, a first end connected to said bottom of said cavity and a second end opposite said first end, wherein said second end is free and in abutment against said at least one sensor or at least partially overlaps said at least one sensor.

6. The validation device according to claim 5, wherein said first end and said second end are connected to each other by means of a continuous, rounded surface free of edges.

7. The validation device according to claim 1, wherein said deflector element comprises at least two foils of elastically yielding material partially overlapping each other.

8. The validation device according to claim 1, wherein at least one of said at least two foils comprised in said deflector element has a plurality of notches, spaced apart from each other, able of modifying a flexural rigidity of said deflector element.

9. The validation device according to claim 8, wherein said notches are parallel to each other and to said movement direction.

10. The validation device according to claim 1, wherein said deflector element is removably connected in a removable manner in a seat delimited along said bottom of said cavity.

11. The validation device according to claim 10, wherein said seat is inclined with respect to said movement direction.

12. The validation device according to claim 10, wherein said seat is convergent towards said at least one sensor.

13. A validation device according to claim 10, wherein said deflector element has a plurality of through apertures delimited at a first end for connecting the connection between said deflector element and respective retaining elements present in said seat.

14. The validation device according to claim 1, wherein said bottom of said cavity has a ramp positioned upstream with respect to said deflector element along said movement direction.

15. A validation device for validation of flexible documents, comprising an input into which a flexible document to be validated is introduced, an output through which said flexible document exits, a passageway interposed between said input and said output through which said flexible document moves, at least one movement member configured to move said flexible document along a movement direction, at least one sensor facing the passageway, and a deflector element protruding inclined from a bottom of said passageway, wherein said deflector element is configured to deflect said flexible document along said movement direction away from said bottom to bring said flexible document against said at least one sensor, wherein said deflector element is elastically deformable.

16. The validation device according to claim 15, wherein said deflector element has, along said movement direction, a first end connected to said bottom of said passageway and a second end opposite said first end, wherein said second end is free and in abutment against said at least one sensor or at least partially overlaps said at least one sensor.

17. The validation device according to claim 15, wherein said deflector element comprises at least two foils of elastically yielding material partially overlapping each other, wherein at least one of said at least two foils comprised in said deflector element has a plurality of notches, spaced apart from each other, able of modifying a flexural rigidity of said deflector element, and wherein said notches are parallel to each other and to said movement direction.

18. The validation device according to claim 15, wherein said deflector element is removably connected in a removable manner in a seat delimited along said bottom of said passageway, and wherein said deflector element has a plurality of through apertures delimited at a first end for connecting the connection between said deflector element and respective retaining elements present in said seat.

19. A method of operating a validation device for validation of flexible documents, the method comprising introducing a flexible document to be validated into an input so that the flexible document is handled through a passageway interposed between said input and an output where said flexible document exits, moving, via at least one movement member, said flexible document along a movement direction, deflecting via at least one deflector element protruding inclined from a bottom of said passageway, said flexible document along said movement direction away from said bottom to bring said flexible document against at least one sensor, wherein said at least one deflector element is elastically deformable.

* * * * *